United States Patent
Hoff

(10) Patent No.: US 9,528,545 B2
(45) Date of Patent: Dec. 27, 2016

(54) CROSSHEAD BEARING

(75) Inventor: Klaus Hubert Hoff, Aachen (DE)

(73) Assignee: Neuman & Esser Maschinenfabrik GmbH & Co. KG, Ubach-Palenberg (DE)

( * ) Notice: Subject to any disclaimer, the term of this patent is extended or adjusted under 35 U.S.C. 154(b) by 1465 days.

(21) Appl. No.: 12/349,902

(22) Filed: Jan. 7, 2009

(65) Prior Publication Data

US 2009/0175566 A1    Jul. 9, 2009

(30) Foreign Application Priority Data

Jan. 9, 2008 (DE) .................. 10 2008 003 698

(51) Int. Cl.
*F16C 5/00* (2006.01)
*F16C 33/10* (2006.01)

(52) U.S. Cl.
CPC ............. *F16C 5/00* (2013.01); *F16C 33/1065* (2013.01)

(58) Field of Classification Search
USPC ................... 384/286–291, 429–430
See application file for complete search history.

(56) References Cited

U.S. PATENT DOCUMENTS

| | | | |
|---|---|---|---|
| 389,691 A * | 9/1888 | Brisay ........................ 105/79 |
| RE17,419 E * | 8/1929 | Chapman ..................... 384/160 |
| 1,749,574 A * | 3/1930 | Ehrenfeld .................... 384/286 |
| 1,921,044 A * | 8/1933 | Sparrow ...................... 384/286 |
| 2,004,254 A * | 6/1935 | Taub .......................... 384/288 |
| 2,035,519 A * | 3/1936 | Apple ......................... 384/279 |
| 2,249,843 A * | 7/1941 | Marsland ..................... 384/292 |
| 2,315,467 A * | 3/1943 | Wahlberg et al. ............. 384/286 |
| 2,629,639 A * | 2/1953 | Johansen ...................... 384/155 |
| 3,049,384 A * | 8/1962 | Caubet ........................ 384/286 |
| 3,131,785 A * | 5/1964 | Blank ........................... 184/6 |
| 3,433,542 A * | 3/1969 | Okano et al. ................. 384/287 |
| 3,610,712 A * | 10/1971 | Endress ....................... 384/287 |
| 3,760,694 A * | 9/1973 | Lieb ............................. 92/73 |
| 3,801,173 A * | 4/1974 | McKindree ................... 384/288 |
| 3,993,370 A * | 11/1976 | Woollenweber ............. 384/287 |
| 4,105,267 A * | 8/1978 | Mori ............................ 384/291 |
| 4,576,488 A * | 3/1986 | Steiner et al. ................ 384/291 |
| 4,609,293 A * | 9/1986 | Bayer et al. ................. 384/469 |
| 4,693,617 A * | 9/1987 | Roemer et al. .............. 384/282 |
| 5,265,700 A * | 11/1993 | Santi ............................ 184/6.5 |
| 6,179,470 B1 * | 1/2001 | Huddleston et al. ......... 384/279 |
| 6,709,160 B1 * | 3/2004 | Ward et al. .................. 384/286 |
| 7,794,152 B2 * | 9/2010 | Horng ......................... 384/100 |

(Continued)

FOREIGN PATENT DOCUMENTS

GB        1456495    * 11/1976

*Primary Examiner* — William Kelleher
*Assistant Examiner* — Gregory Prather
(74) *Attorney, Agent, or Firm* — Buchanan Ingersoll & Rooney PC

(57) ABSTRACT

A crosshead bearing is disclosed, in particular for stroke piston machines, including a bearing surface (1) that contains multiple oilways (2), each of which is connected through a rearward borehole (3) to a lubricant source.

The goal of the invention is to lower the peak oil pressure at the central load positions (4a, 4b) of the crosshead bearing and thereby achieve an overall load increase.

This is achieved according to the invention by having one oilway (2) at each of the opposing central load positions (4a, 4b) of the bearing surface (1) be designated as the main discharge oilway (5).

18 Claims, 3 Drawing Sheets

(56) References Cited

U.S. PATENT DOCUMENTS

| | | | |
|---|---|---|---|
| 7,980,216 B2* | 7/2011 | Elnick et al. | 123/90.44 |
| 8,147,144 B2* | 4/2012 | Ishigo et al. | 384/288 |
| 2004/0202391 A1* | 10/2004 | Welch et al. | 384/286 |
| 2006/0002643 A1* | 1/2006 | Aubele | 384/288 |
| 2010/0046868 A1* | 2/2010 | Belmonte et al. | 384/286 |
| 2011/0075957 A1* | 3/2011 | Gutknecht | 384/286 |

* cited by examiner

CROSSHEAD BEARING

BACKGROUND OF THE INVENTION

Field of the Invention

The invention concerns a crosshead bearing, in particular for stroke piston machines, including a bearing surface that contains multiple oilways running axially, each of which is connected through a rearward borehole to a lubricant supply.

Background of the Art

A stroke piston device 10 is shown in FIG. 4 that has a crosshead bearing 12 and a lubricant supply 14. When the crosshead bearing is constructed, regardless of the expected operating conditions, there must be an oil source between the crosshead bearing and the pivot connected to it. Because a crosshead bearing has no rotational motion at the bearing, there is no appreciable fresh oil transport generated by rotary motion. Oil pushed out by the radial motion on the loaded side of the bearing must be replaced with fresh oil during the next movement of the pivot on the opposite side of the bearing, because only limited lateral replenishment is possible due to the quick motion of the pivot, so the oil vapor pressure is reduced and the result is an inadequate supply of oil to this area. This area of the bearing must be constructed so that it refills until the next load stroke.

Usually, in particular in compressor construction, oilways distributed in a circumferential direction are installed on the bearing surface and supplied with pressurized oil from the back of the bearing. Under the assumption that oil transport outward from each of the oilways in the loaded bearing surface is made possible essentially by the swinging motion of the crosshead bearing, the distance between oilways is generally based on the size of the swing angle, i.e., for example, a distance of 15° from each other. For this reason, there is no oilway in the bearing's force direction, because the roughly parabolic pressure build-up in the opposing central load positions should not be interrupted by an oilway. A crosshead bearing of this type is described in DE 35 19 984 A1.

DE 27 11 983 A1 discloses bearing seats with one or more oilways arranged circumferentially within an angle range of 60° to 150°. The sum of the lengths of the ranges that appear in any cross section with axial direction should be 5 to 50% of the bearing seat width, such that a predominantly dense structure of oilways is created. The predominantly transversally-running oilways in known art structures of this type are distributed arbitrarily and always placed outside of the areas where the highest pressure is expected.

AT 007 501 U1 discloses a crosshead bearing with just one oilway placed outside of the central load positions. Experts in this field are of the opinion that it is disadvantageous to design known art crosshead bearings with just one oilway in the highest load zone, because the force applied by the connecting rod to the gudgeon pin is always in the direction of the connecting rod axis. The surface pressure in this area of a central load position would be increased by the oilway.

The fundamental disadvantage of known art crosshead bearings lies in the fact that both of the bearing surfaces located in the area of the central load positions are essentially linked to the hydrodynamic pressure build-up. However many oilways there are, they are outside of these areas. The bearing surfaces located farther away from the load positions build up only low pressure, because the displacement mechanism there has a significantly weaker effect due to the wider lubrication opening in that area. The peak oil pressure is relatively high in the central load position areas.

BRIEF SUMMARY OF THE INVENTION

Therefore, the goal of the invention is to lower the peak oil pressure at the central load positions of the crosshead bearing and thereby achieve an overall load increase.

This goal is achieved according to the invention by having a crosshead bearing in which an oilway is placed in each of the opposing central load positions of the bearing surface and acts as a main discharge channel.

Below the central load positions, the bearing surface areas are understood to be on the connecting rod axis. This axis lies in the highest force direction for the forces to be expected during operation. As installed, the main discharge oilways are at the 6- and 12-o'clock positions on the crosshead bearing.

Hydrodynamic pressure build-up at the central load positions is prevented by pressure on the external form. Therefore, hydrodynamic pressure must be based in the bearing surfaces to the left and right of the respective main discharge oilway. The result of this construction is that two segments of the bearing surface, instead of just one, are involved in hydrodynamic power transmission. Consequently, the maximum oil pressure according to the invention occurs at two locations on either side of a main discharge oilway, but is therefore much lower.

By preference, there is a single auxiliary discharge oilway in the bearing surface on either side of the respective main discharge oilway. The pressure build-up therefore occurs on the bearing surfaces located to the left and right of the main discharge oilway, up to the auxiliary discharge oilway. No appreciable pressure build-up occurs in the segments located beyond the auxiliary discharge oilways of the bearing surface, so these bearing surfaces are no longer involved in load transmission. For this reason, there is little need for additional oilways in these areas.

It has proven advantageous for the auxiliary discharge oilways to run at an angle of 20°-40° to the adjacent main discharge oilway, with 30° being especially preferable. This relatively wide circumferential spacing of the oilways is possible, without oil source problems, in particular due to the central supply of fresh oil through the main discharge oilway.

Oil supply channels are placed as appropriate on opposite sides of the bearing surface at an angle of about 90° to each of the main discharge oilways. The oil supply channels serve exclusively the oil source and not the discharge from the bearing surface in this area.

The oil supply channels are by preference placed opposite to each other, so that they are uniformly distributed in a circumferential direction with regard to the main discharge oilways and a regular oil source is guaranteed. Consequently, the oil supply channels are in the 3- and 9-o'clock positions.

According to a particularly preferred version of the invention, the main discharge oilways and/or auxiliary discharge oilways and/or oil supply channels run in an axial direction straight through the bearing surface. This also results in a constant distance between the oilways along the entire axial length of the crosshead bearing and thereby an especially favorable lubricant source.

The main discharge oilways and/or auxiliary discharge oilways and/or oil supply channels can be distanced axially from the respective ends of the bearing surface. This has the advantage that no lubricating oil can run forward or backward out of the oilways.

By preference, the main discharge oilways and/or auxiliary discharge oilways and/or oil supply channels are placed concentrically and axially, so that a steady lubricant source is guaranteed, also axially, through the concentric boreholes flowing into the oilways.

BRIEF DESCRIPTION OF THE SEVERAL VIEWS OF THE DRAWINGS

For better understanding, the invention is explained in greater detail below, with reference to the following three figures. Shown in FIG. 1: a cross-section of a crosshead bearing according to prior art.

DETAILED DESCRIPTION OF THE INVENTION

Figure 1:
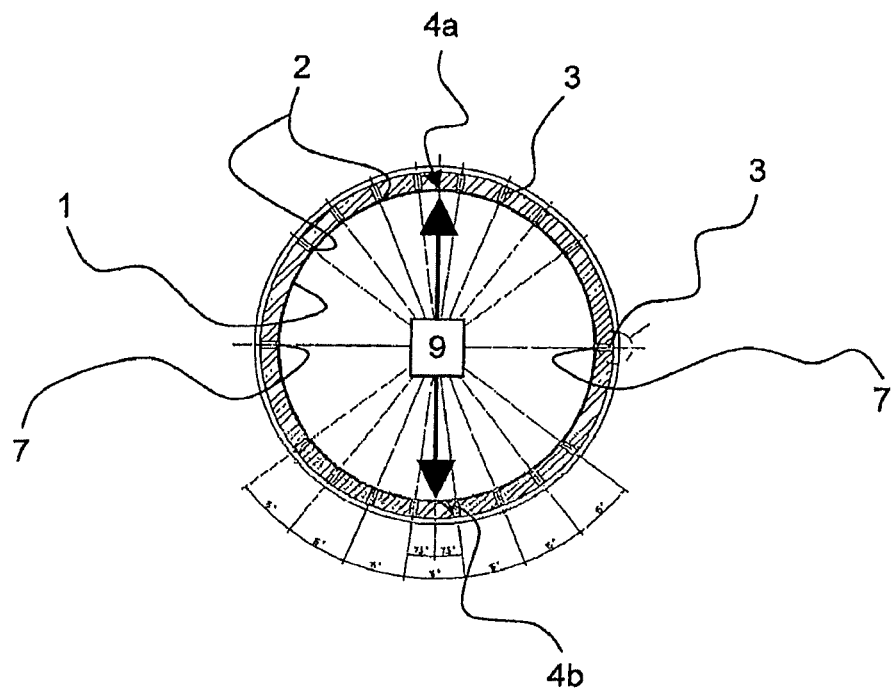

FIG. 1 shows a cross-section of a crosshead bearing according to prior art with a bearing surface 1 that is circular in cross-section. The upper and lower halves of the bearing surface 1 each have eight oilways 2 which run axially through the bearing surface 1. Each of the oilways 2 has a borehole 3 running radially through the crosshead bearing, through which lubricating oil for that particular oilway 2 is supplied.

The oilways 2 are placed at 15° angles to each other in a circumferential direction, and there is no oilway 2 in the area of the central load positions 4a, 4b.

The load positions 4a, 4b located in force direction 9 are at the 6- and 12-o'clock positions and are therefore exactly concentric between two adjacent oilways 2. The oilways 2 were placed near the load positions 4a, 4b because it has assumed up to now in the field that it is especially advantageous not to weaken the segments of the bearing surface 1 located in the area of the force direction 9.

At right angles to the force direction 9, oil supply channels 7, placed opposite each other in the bearing surface 1, can be seen, and are also supplied with lubricating oil through boreholes 3. Consequently, the oil supply channels 7 are in the 3- and 9-o'clock positions.

Figure 2:
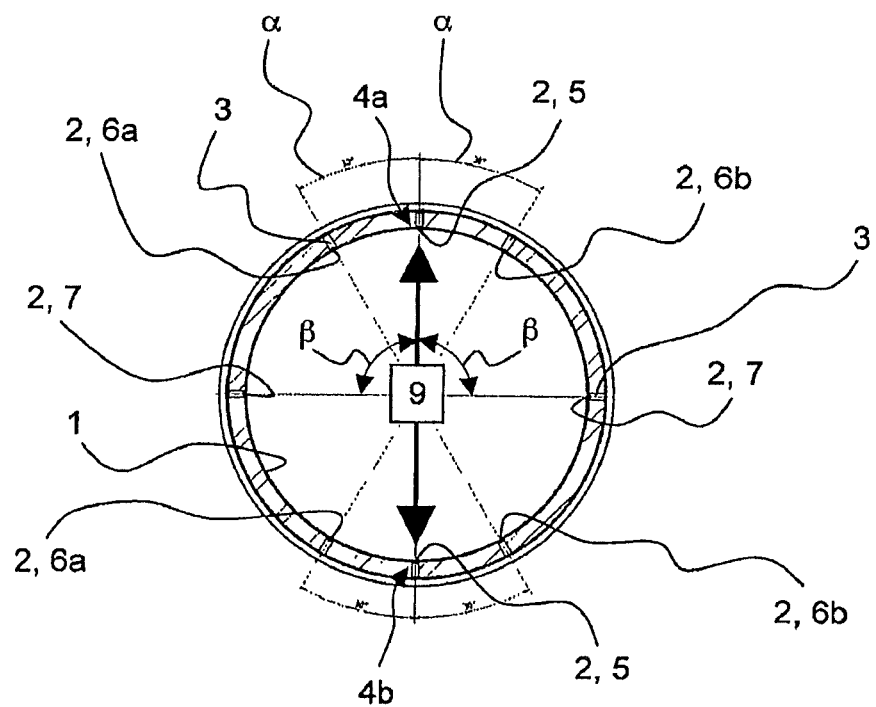
FIG. 2: a cross-section of a crosshead bearing according to the invention.

A load increase on the crosshead bearing is achieved according to the invention by placing the oilways 2 as shown in FIG. 2. Here, two of the oilways 2 running axially in the bearing surface 1 lie in the force direction 9, each performing the function of a main discharge oilway 5 on opposite sides of the crosshead bearing. With the main discharge oilways 5 placed in the area of the central load positions 4a, 4b, these segments of the bearing surface 1 are not subjected to any forces; instead, the forces are distributed onto the adjacent segments to the left and right in a circumferential direction. The main discharge oilways 5 are in the 6- and 12-o'clock positions on the crosshead bearing.

Beside each of the two main discharge oilways 5 there is an auxiliary discharge oilway 6a or 6b respectively, installed at an angle α of ±30°. The auxiliary discharge oilways 6a, 6b limit the forces on the bearing surface 1 radiating out from the main discharge oilway 5 in a circumferential direction. The result is that only the segments of the bearing surface 1 between the main discharge oilway 5 and the adjacent auxiliary discharge oilways 6a, 6b are subjected to force.

Oil supply channels 7 are also placed on opposite sides of the crosshead bearing at an angle β of about 90°; they are not used for discharge from the bearing surface 1 in this segment but instead only for the lubricant source.

Figure 3:
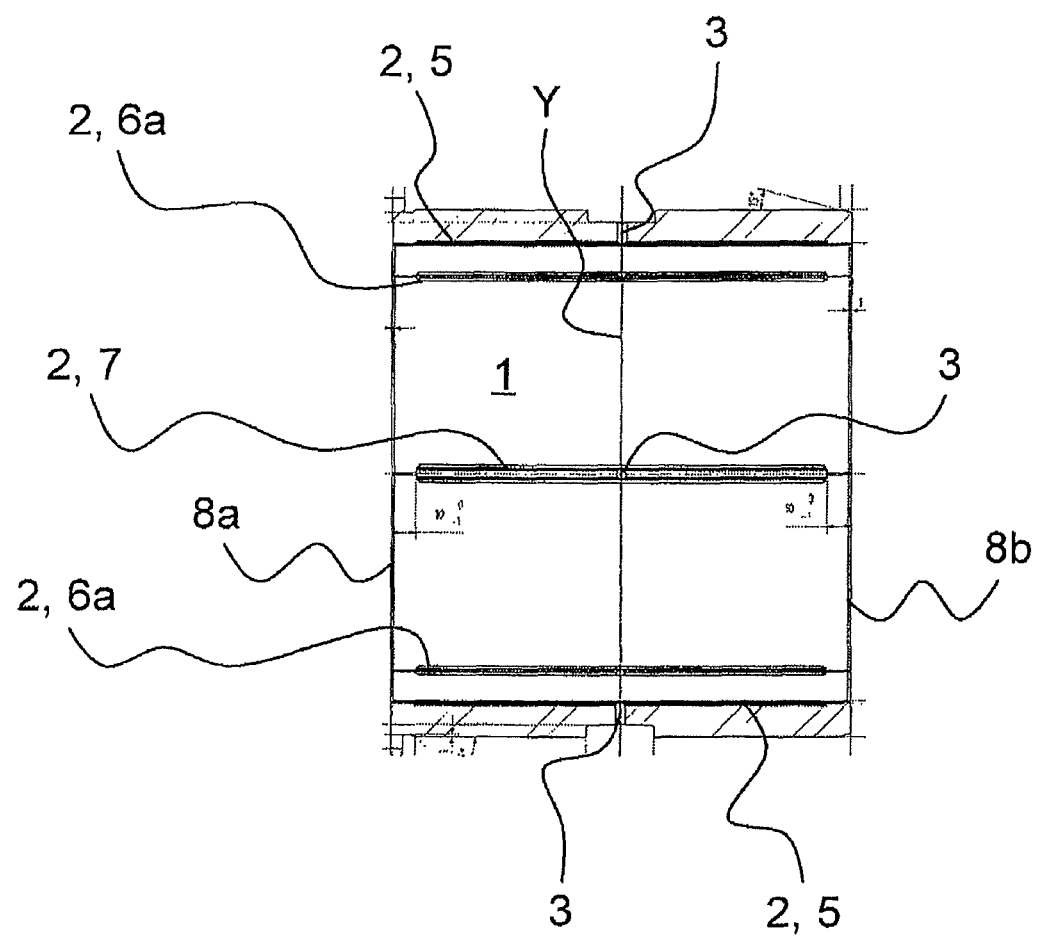
FIG. 3: a longitudinal section of a crosshead bearing according to the invention.
Figure 4:
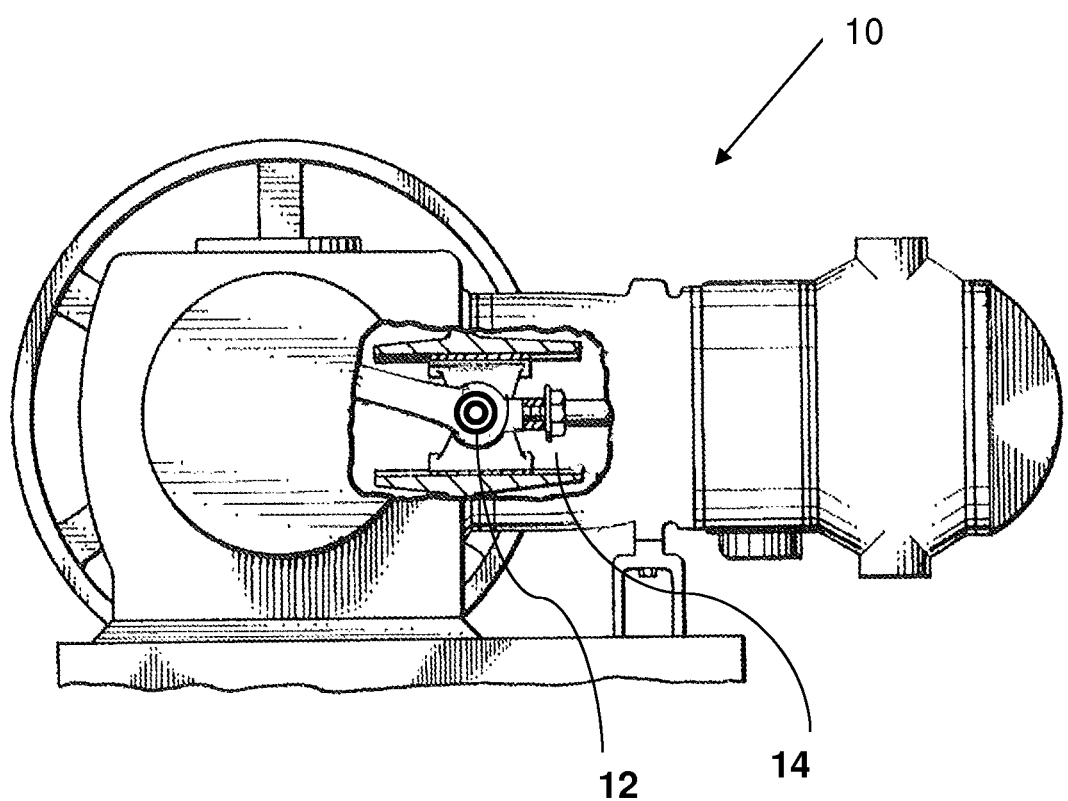
FIG. 4: is a side of a view of a stroke piston device in the prior art, having a portion of the housing cut away to show the crosshead bearing.

FIG. 3 shows a longitudinal section of the crosshead bearing according to the invention. The radially placed boreholes 3 are in a vertical plane that lies at right angles to the axial extent of the crosshead bearing and intersects the center axis Y.

On both sides of the center axis Y, the oilways 2 run symmetrically in the direction of the axial ends 8a, 8b of the bearing surface 1. However, this means that the oilways 2 are placed relative to the axial ends 8a, 8b in such a way that there is always a segment of the bearing surface 1 between every oilway 2 and the axial end 8a, 8b next to it.

DRAWING REFERENCE LIST

1 Bearing surface
2 Oilway
3 Borehole
4a, b Central load positions
5 Main discharge oilway
6a, b Auxiliary discharge oilway
7 Oil supply channel
8a, b Axial end of the bearing surface
9 Force direction
Y Center axis
α Angle between main and auxiliary discharge oilways
β Angle between main discharge oilway and oil supply channel

The invention claimed is:

1. A crosshead bearing for stroke piston machines, comprising:
 a bearing surface having a plurality of lubricating oilways running axially, each of which is connected through a rearward borehole to a lubricant supply; and
 wherein said bearing surface comprises opposing central load positions, wherein the opposing central load positions comprise a first opposing central load position and a second opposing central load position, the first opposing central load position opposing the second opposing central load position; and
 wherein a first lubricating oilway of the plurality of lubricating oilways is located at the first opposing central load position and a second lubricating oilway of the plurality of lubricating oilways is located at the second opposing central load position; and
 wherein the first lubricating oilway at the first opposing central load position of the bearing surface is designated as a first main discharge oilway and the second lubricating oilway at the second opposing central load position of the bearing surface is designated as a second main discharge oilway; and
 wherein at least one of the first main discharge oilway and the second main discharge oilway run axially straight on the bearing surface.

2. The crosshead bearing of claim 1, further comprising a first auxiliary discharge oilway and a second auxiliary discharge oilway in the bearing surface arranged on each side of the first main discharge oilway and a third auxiliary discharge oilway and a fourth auxiliary discharge oilway in the bearing surface arranged on each side of the second main discharge oilway.

3. The crosshead bearing of claim 2, wherein each of the auxiliary discharge oilways are placed at an angle of between 20°-40° relative to an adjacent main discharge oilway.

4. The crosshead bearing of claim 3, wherein each of the auxiliary discharge oilways are placed at an angle of 30° relative to an adjacent main discharge oilway.

5. The crosshead bearing of claim 1, further comprising a first oil supply channel in the bearing surface at an angle of about 90° to the first main discharge oilway.

6. The crosshead bearing as in claim 5, further comprising a second oil supply channel and wherein the two oil supply channels are placed opposite each other.

7. The crosshead bearing of claim 1, further comprising a first auxiliary discharge oilway in the bearing surface on each side of the first main discharge oilway and a second auxiliary discharge oilway in the bearing surface on each side of the second main discharge oilway and at least one oil supply channel, wherein at least one of the auxiliary discharge oilways, and the at least one oil supply channel runs axially straight on the bearing surface.

8. The crosshead bearing of claim 1, further comprising a first auxiliary discharge oilway in the bearing surface on each side of the first main discharge oilway and a second auxiliary discharge oilway in the bearing surface on each side of the second main discharge oilway and at least one oil supply channel, wherein at least one of the main discharge oilways, auxiliary discharge oilways, and the at least one oil supply channel is distanced axially from the respective ends of the bearing surface.

9. The crosshead bearing of claim 1, further comprising a first auxiliary discharge oilway in the bearing surface on each side of the first main discharge oilway and a second auxiliary discharge oilway in the bearing surface on each side of the second main discharge oilway and at least one oil supply channel, wherein at least one of the main discharge oilways, auxiliary discharge oilways, and the at least one oil supply channel is centered axially.

10. A device comprising:
a stroke piston device having a crosshead bearing, the crosshead bearing having a bearing surface;
wherein the bearing surface has a plurality of lubricating oilways running axially, each of which is connected through a rearward borehole to a lubricant supply; and
wherein the bearing surface comprises a first opposing central load position and a second opposing central load position, the first opposing central load position opposing the second opposing central load position; and
wherein a first lubricating oilway at the first opposing central load position of the bearing surface is designated as a first main discharge oilway and a second lubricating oilway at the second opposing central load position of the bearing surface is designated as a second main discharge oilway; and
wherein at least one of the first main discharge oilway and the second main discharge oilway run axially straight on the bearing surface.

11. The device of claim 10 wherein the bearing surface further comprises at least one auxiliary discharge oilway of the plurality of lubricating oilways on each side of the first main discharge oilway and on each side of the second main discharge oilway.

12. The device of claim 11 wherein the main discharge oilways run axially straight on the bearing surface.

13. The device of claim 11 wherein the auxiliary discharge oilways are placed at an angle of between 20°-40° relative to an adjacent main discharge oilway.

14. The device of claim 13 wherein the auxiliary discharge oilways are placed at an angle of 30° relative to the adjacent main discharge oilway.

15. The device of claim 10 wherein the bearing surface has a first oil supply channel at an angle of about 90° relative to the main discharge oilways.

16. The device of claim 15 wherein the bearing surface has a second oil supply channel at an angle of about 90° relative to the main discharge oilways and an angle of about 180° relative to the first oil supply channel.

17. The device of claim 16 wherein the bearing surface has at least one auxiliary discharge oilway between each oil supply channel and each main discharge oilway.

18. The device of claim 15 wherein the first oil supply channel is connected to the lubricant supply through a first rearward borehole and second oil supply channel is connected to the lubricant supply through a second rearward borehole.

\* \* \* \* \*